G. W. LILLEY.
VEHICLE WHEEL TIRE.
APPLICATION FILED JULY 13, 1908.
925,711. Patented June 22, 1909.
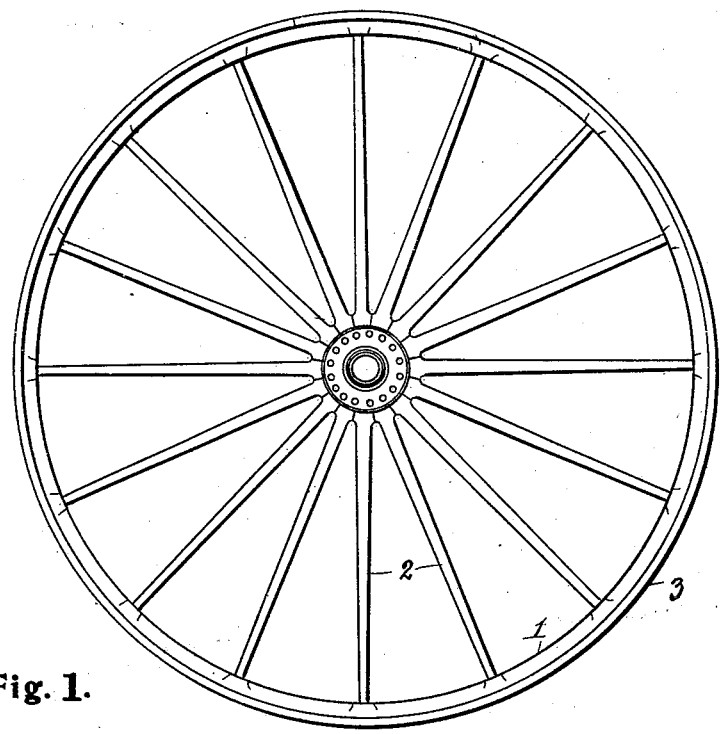
Fig. 1.
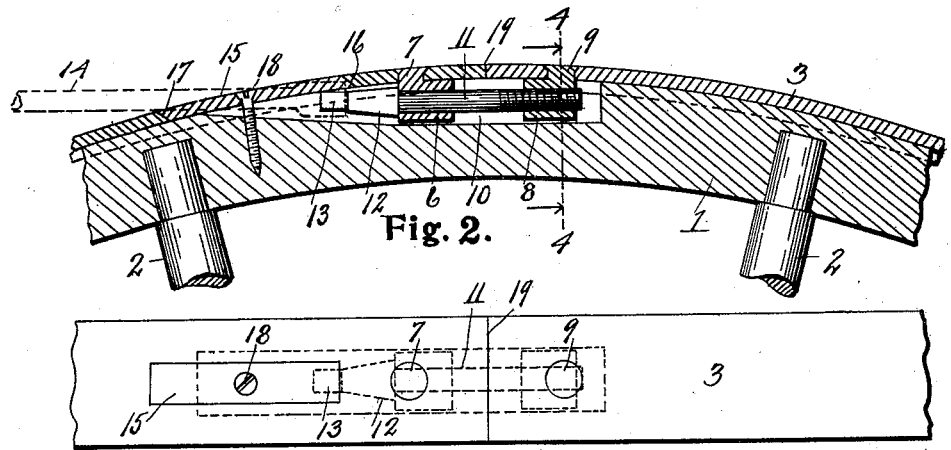
Fig. 2.
Fig. 3.
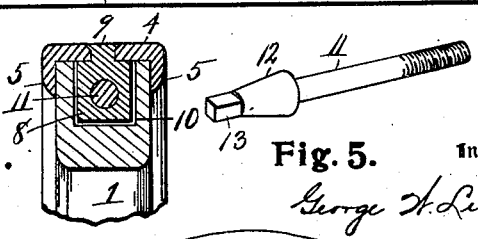
Fig. 4. Fig. 5.
Witnesses
Inventor
George W. Lilley
By
Attorneys

UNITED STATES PATENT OFFICE.

GEORGE W. LILLEY, OF PONTIAC, MICHIGAN, ASSIGNOR OF ONE-HALF TO JOHN WATCHPOCKET, OF PONTIAC, MICHIGAN.

VEHICLE-WHEEL TIRE.

No. 925,711.      Specification of Letters Patent.      Patented June 22, 1909.

Application filed July 13, 1908. Serial No. 443,264.

*To all whom it may concern:*

Be it known that I, GEORGE W. LILLEY, a citizen of the United States, residing at Pontiac, in the county of Oakland, State of Michigan, have invented certain new and useful Improvements in Vehicle-Wheel Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to tires for vehicle wheels, and consists in the construction and arrangement of parts hereinafter more fully set forth and pointed out particularly in the claims.

The object of the invention is to provide simple and efficient means whereby the use of a channeled tire is made possible, the arrangement being such as to enable said tire to be readily attached to or removed from the felly, obviating the use of the tire bolts commonly employed for securing the tire to the felly of the wheel, and producing a wheel of great strength and rigidity.

The above object is attained by the structure illustrated in the accompanying drawings, in which:—

Figure 1 is an elevation of a wheel provided with a tire in accordance with my invention. Fig. 2 is an enlarged circumferential view through a segment of the tire and felly at the point where the ends of the tire are coupled, showing the means for detachably joining the same. Fig. 3 is a plan view of a section of the tire at the point of meeting of the ends thereof, showing by dotted lines the position of the parts employed for drawing the ends of the tire together. Fig. 4 is a transverse section on line 4—4 of Fig. 2. Fig. 5 is a perspective view of the threaded bolt employed to connect the ends of the tire.

Referring to the characters of reference, 1 designates the felly of a wheel which may be of the ordinary structure and which receives the outer ends of the spokes 2 in the usual manner. The tire 3, as will be seen, is channeled, being provided with the rectangular marginal flanges 5 which extend onto the sides of the felly.

In order to enable a tire of this character to be placed upon the felly of a wheel, it is necessary that its ends shall be detachably connected in a manner to enable the tire to be contracted upon the felly after being placed in position thereon. To enable the accomplishment of this result, I employ a lug or block 6 having an aperture therethrough, and provided with an integral rivet 7 which is riveted in an aperture formed in the tire near one end thereof. I also employ a second block or lug 8 having a tapped aperture therethrough and provided with an integral rivet 9 which is riveted in an aperture formed through the tire near its opposite end.

A recess 10 is formed in the felly of the wheel adapted to receive the bolt 11 which passes freely through the lug 6 and is threaded to screw into the lug 8. Upon the bolt 11 is a shoulder 12 adapted to bear against the end of the lug 6 and the end of said bolt is squared, as at 13, or otherwise shaped to receive a socket wrench shown by dotted lines 14 in Fig. 2. The recess 10 in the felly is so shaped as to enable the bolt to be passed through the lug 6 and screwed into the lug 8 after the tire shall have been placed in position upon the wheel. To afford access to said bolt for the purpose of manipulating it, the tire is provided with a removable plate 15, the ends of which are beveled in the same direction; the forward end of said plate being adapted to engage under the beveled terminal 16 of the opening in the tire in which it lies, and the rear end of said plate being adapted to engage the correspondingly shaped terminal 17 of said opening. A screw 18 passes through the plate 15 and into the felly of the wheel to detachably retain said plate in position, the forward end of which is supported on the squared end of the bolt 11.

In applying the tire to the rim or felly of a wheel, the bolt 11 is first unscrewed from the lug 8, thereby disconnecting the ends of the tire and permitting them to be separated in order to place the channeled tire upon the felly. After the tire is in position upon the felly, the bolt is screwed into the lug 8 to draw the ends of the tire together and contract it firmly upon the felly of the wheel. Should the ends of the tire meet as at 19 before being contracted sufficiently to securely embrace and confine the felly, a portion of one end of the tire may be cut off by means of a hack-saw to enable a further contraction thereof as desired. By this improved arrangement, tires may be readily placed upon the wheels of vehicles, obviating the necessity of going to a wagon shop for that purpose, as is commonly required. It will also be evident that by employing this improved means for fastening the tire on the felly, the ordinary tire bolts may be dispensed with.

A channeled tire renders the wheel much stronger and more rigid than a flat tire, while the marginal flanges extending onto the felly serve as a guard therefor and protect the sides of the felly from wear.

Having thus fully set forth my invention, what I claim as new and desire to secure by Letters Patent, is:—

1. In a vehicle wheel tire, the combination with a continuous felly having a recess in the periphery only thereof, of a channeled tire embracing said felly, the ends of said tire being detachable and meeting in the arc of a circle described by the tire tread, lugs rigidly secured to and projecting inwardly from the tire remote from its ends, said lugs lying in said recess, a bolt extending between and connecting said lugs for contracting the tire upon the felly, and a plate removably seated in the tread of the tire affording access to said bolt.

2. In a vehicle wheel tire, the combination with a continuous felly having a recess in the periphery thereof, of a tire embracing said felly having opposed free ends curved concentric with the circle described by the wheel, a lug riveted to each of the ends of the tire lying in said recess, a bolt passing through said lugs, said bolt being freely rotatable in one lug and having a threaded engagement with the other, and having a shoulder thereon which engages the face of the lug in which it is mounted to rotate freely, and a removable plate set into the tread of the tire affording access to said bolt.

In testimony whereof, I sign this specification in the presence of two witnesses.

GEORGE W. LILLEY.

Witnesses:
  FRANK L. COVERT,
  C. F. LUELLEMANN.